US010892506B2

(12) United States Patent
Wang et al.

(10) Patent No.: US 10,892,506 B2
(45) Date of Patent: Jan. 12, 2021

(54) FUEL CELL SYSTEM AND OPERATING METHOD THEREOF

(71) Applicant: CUMMINS ENTERPRISE LLC, Indianapolis, IN (US)

(72) Inventors: Honggang Wang, Malta, NY (US); Xiangdong Kong, Shanghai (CN)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 0 days.

(21) Appl. No.: 16/777,341

(22) Filed: Jan. 30, 2020

(65) Prior Publication Data

US 2020/0168934 A1 May 28, 2020

Related U.S. Application Data

(62) Division of application No. 15/605,227, filed on May 25, 2017, now Pat. No. 10,593,974.

(30) Foreign Application Priority Data

May 27, 2016 (CN) .......................... 2016 1 0363148

(51) Int. Cl.

*H01M 8/04992* (2016.01)
*H01M 8/0444* (2016.01)

(Continued)

(52) U.S. Cl.

CPC ... *H01M 8/04992* (2013.01); *H01M 8/04097* (2013.01); *H01M 8/04388* (2013.01);

(Continued)

(58) Field of Classification Search

CPC ......... H01M 8/04992; H01M 8/04462; H01M 8/04447; H01M 8/04097; H01M 8/04388; H01M 8/04589

See application file for complete search history.

(56) References Cited

U.S. PATENT DOCUMENTS

| | | | |
|---|---|---|---|
| 4,722,873 | A | 2/1988 | Matsumura |
| 5,342,703 | A | 8/1994 | Kawasaki et al. |

(Continued)

FOREIGN PATENT DOCUMENTS

| | | |
|---|---|---|
| AU | 2002325650 | 4/2008 |
| CN | 102232256 A | 11/2011 |

(Continued)

OTHER PUBLICATIONS

Gaynor et al., “On control concepts to prevent fuel starvation in solid oxide fuel cells”, Journal of Power Sources, vol. 180, Issue: 1, pp. 330-342, May 15, 2008.

(Continued)

*Primary Examiner* — Stewart A Fraser

(74) *Attorney, Agent, or Firm* — Barnes & Thornburg LLP

(57) ABSTRACT

A fuel cell system is disclosed, which includes an anode recirculation loop comprising a fuel cell stack for generating power, a flowmeter for measuring a fuel flow rate of a fuel provided into the anode recirculation loop, a current measuring device for measuring a current drawn from the fuel cell stack, a recycle ratio measuring device for measuring a recycle ratio in the anode recirculation loop, and a processor for estimating a fuel utilization of the fuel cell stack based on the measured fuel flow rate, the measured current and the measured recycle ratio. Methods for operating the fuel cell system are also disclosed.

20 Claims, 6 Drawing Sheets

(51) Int. Cl.
*H01M 8/04089* (2016.01)
*H01M 8/0438* (2016.01)
*H01M 8/04537* (2016.01)

(52) U.S. Cl.
CPC ... *H01M 8/04447* (2013.01); *H01M 8/04462* (2013.01); *H01M 8/04589* (2013.01)

(56) References Cited

U.S. PATENT DOCUMENTS

| | | | |
|---|---|---|---|
| 5,413,878 | A | 5/1995 | Williams et al. |
| 5,624,768 | A | 4/1997 | Tanokura |
| 5,637,414 | A | 6/1997 | Inoue et al. |
| 6,033,794 | A | 3/2000 | George et al. |
| 6,096,448 | A | 8/2000 | Wilkinson et al. |
| 6,296,964 | B1 | 10/2001 | Ren et al. |
| 6,485,852 | B1 | 11/2002 | Miller et al. |
| 6,492,048 | B1 | 12/2002 | Draper et al. |
| 6,531,243 | B2 | 3/2003 | Thom |
| 6,558,827 | B1 | 5/2003 | Reiser |
| 6,610,434 | B1 | 8/2003 | Draper et al. |
| 6,926,979 | B2 | 8/2005 | Cao |
| 6,936,370 | B1 | 8/2005 | Knights et al. |
| 7,255,956 | B2 | 8/2007 | McElroy et al. |
| 7,297,429 | B2 | 11/2007 | Cavalca et al. |
| 7,419,731 | B2 | 9/2008 | Manning et al. |
| 7,456,517 | B2 | 11/2008 | Campbell et al. |
| 7,531,262 | B1 | 5/2009 | Simpson et al. |
| 7,553,568 | B2 | 6/2009 | Keefer |
| 7,611,785 | B2 | 11/2009 | Murayama |
| 7,651,800 | B2 | 1/2010 | Kadowaki et al. |
| 7,732,073 | B2 | 6/2010 | Reiser |
| 7,732,084 | B2 | 6/2010 | Liu et al. |
| 7,800,340 | B2 | 9/2010 | Berntsen et al. |
| 7,807,302 | B2 | 10/2010 | Reiser |
| 7,808,129 | B2 | 10/2010 | Mazumder et al. |
| 7,816,045 | B2 | 10/2010 | Oishi et al. |
| 7,833,668 | B2 | 11/2010 | Ballantine et al. |
| 8,062,804 | B2 | 11/2011 | Daly et al. |
| 8,101,307 | B2 | 1/2012 | McElroy et al. |
| 8,129,056 | B2 | 3/2012 | Baaser et al. |
| 8,153,324 | B2 | 4/2012 | Song et al. |
| 8,197,978 | B2 | 6/2012 | Ballantine et al. |
| 8,206,857 | B2 | 6/2012 | Bai et al. |
| 8,211,583 | B2 | 7/2012 | Weingaertner et al. |
| 8,263,283 | B2 | 9/2012 | Muramatsu et al. |
| 8,268,497 | B2 | 9/2012 | Takada et al. |
| 8,409,758 | B2 | 4/2013 | Valensa |
| 8,435,691 | B2 | 5/2013 | Dan |
| 8,470,481 | B2 | 6/2013 | Kozu et al. |
| 8,470,484 | B2 | 6/2013 | Higuchi |
| 8,507,144 | B2 | 8/2013 | Astrom et al. |
| 8,563,193 | B2 | 10/2013 | Nagatani et al. |
| 8,597,806 | B2 | 12/2013 | Roberts et al. |
| 8,685,583 | B2 | 4/2014 | Weingaertner et al. |
| 8,691,464 | B2 | 4/2014 | Ia O' et al. |
| 8,697,451 | B2 | 4/2014 | Daly |
| 8,715,872 | B2 | 5/2014 | Shimoi et al. |
| 8,822,090 | B2 | 9/2014 | Ma et al. |
| 8,841,042 | B2 | 9/2014 | Erikstrup et al. |
| 8,986,900 | B2 | 3/2015 | Gottmann et al. |
| 9,077,006 | B2 | 7/2015 | Berlowitz et al. |
| 9,105,895 | B2 | 8/2015 | Dan |
| 2004/0033398 | A1 | 2/2004 | Kearl et al. |
| 2004/0126634 | A1 | 7/2004 | Hatoh et al. |
| 2005/0003244 | A1 | 1/2005 | Pham |
| 2005/0244682 | A1 | 11/2005 | Meacham |
| 2006/0078765 | A1 | 4/2006 | Yang et al. |
| 2006/0204826 | A1 | 9/2006 | Borchers |
| 2007/0003814 | A1 | 1/2007 | Fisher et al. |
| 2007/0092773 | A1 | 4/2007 | Guo et al. |
| 2007/0259219 | A1 | 11/2007 | Ou et al. |
| 2009/0061271 | A1 | 3/2009 | Sekino et al. |
| 2010/0040914 | A1 | 2/2010 | Ramaswamy et al. |
| 2010/0190089 | A1 | 7/2010 | Akiyama |
| 2010/0266923 | A1 | 10/2010 | McElroy et al. |
| 2011/0151344 | A1 | 6/2011 | Heo et al. |
| 2011/0207016 | A1 | 8/2011 | Akiyama |
| 2012/0034539 | A1 | 2/2012 | George et al. |
| 2012/0052410 | A1 | 3/2012 | Simpson et al. |
| 2012/0148933 | A1 | 6/2012 | Takashi et al. |
| 2012/0208099 | A1 | 8/2012 | Chen et al. |
| 2013/0118077 | A1 | 5/2013 | Lines et al. |
| 2013/0183599 | A1 | 7/2013 | Otsuka et al. |
| 2013/0209903 | A1 | 8/2013 | Otsuka et al. |
| 2013/0316257 | A1 | 11/2013 | Mizuno et al. |
| 2014/0089055 | A1 | 3/2014 | Smith et al. |
| 2014/0106247 | A1 | 4/2014 | Higdon et al. |
| 2014/0170518 | A1 | 6/2014 | Kim et al. |
| 2014/0186733 | A1 | 7/2014 | Qi |
| 2014/0329160 | A1 | 11/2014 | Ramaswamy et al. |
| 2014/0349144 | A1 | 11/2014 | Kim et al. |
| 2015/0004515 | A1 | 1/2015 | Patterson, Jr. et al. |
| 2015/0228990 | A1 | 8/2015 | Ballantine et al. |
| 2015/0357662 | A1* | 12/2015 | Noponen .......... H01M 8/04447 429/444 |
| 2016/0104906 | A1 | 4/2016 | Wang et al. |

FOREIGN PATENT DOCUMENTS

| | | |
|---|---|---|
| CN | 102947995 A | 2/2013 |
| CN | 104617319 A | 5/2015 |
| CN | 105576268 | 5/2016 |
| CN | 106910912 | 6/2017 |
| DE | 102011088120 | 6/2013 |
| EP | 0039237 | 11/1981 |
| EP | 0263052 | 4/1988 |
| EP | 0401834 | 12/1990 |
| EP | 1421639 | 5/2004 |
| EP | 2477266 | 7/2012 |
| EP | 3182493 | 6/2017 |
| GB | 2499488 A | 8/2013 |
| GB | 2518681 | 4/2015 |
| WO | WO 2001/061775 | 8/2001 |
| WO | WO 2002/069430 | 9/2002 |
| WO | WO 2008/048270 | 4/2008 |
| WO | WO 2010/019115 | 2/2010 |
| WO | WO 2010/123144 | 10/2010 |
| WO | WO 2012/069693 | 5/2012 |
| WO | WO 2012/091037 | 7/2012 |
| WO | WO 2013/156666 | 10/2013 |
| WO | WO 2013/160521 | 10/2013 |
| WO | WO 2013/160522 | 10/2013 |
| WO | WO 2015/124700 | 8/2015 |
| WO | WO 2015/152759 | 10/2015 |

OTHER PUBLICATIONS

Das et al., "Steady-State and Transient Analysis of a Steam-Reformer Based Solid Oxide Fuel Cell System", Journal of Fuel Cell Science and Technology, vol. 7, Issue: 1, pp. 10, Nov. 11, 2009.

U.S. Appl. No. 15/605,227, filed May 25, 2017.

* cited by examiner

FUEL CELL SYSTEM AND OPERATING METHOD THEREOF

CROSS-REFERENCE TO RELATED APPLICATIONS

This patent application is a Divisional of U.S. patent application Ser. No. 15/605,227, filed May 25, 2017, which claims priority to Chinese Patent Application No. 201610363148.0, filed May 27, 2016, the disclosures of which are incorporated herein by reference in their entirety.

BACKGROUND

This disclosure relates generally to the fuel cell field, and more particularly to fuel cell systems and methods for operating the fuel cell systems.

Fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems are being widely developed as an energy supply system because fuel cells are environmentally superior and highly efficient. To improve system efficiency and fuel utilization and reduce external water usage, the fuel cell system usually includes an anode recirculation loop. As single fuel cell can only generate 1V voltage, therefore, a plurality of fuel cells are usually stacked together (usually referred to as a fuel cell stack) to get desired voltage.

A fuel utilization (UF) is a critical variable in the fuel cell systems. The fuel utilization indicates the ratio of consumed equivalent hydrogen to the net available equivalent hydrogen in an anode of the fuel cell. The equivalent hydrogen of a mixed gas refers to the sum of molar flowrate of each species multiplied by the number of hydrogen it can produce.

The fuel utilization may affect efficiency of the fuel cell system. High fuel utilization may enhance fuel efficiency of the fuel cell system, so the high fuel utilization may imply high fuel efficiency of the fuel cell system. However, increasing fuel utilization may also increase the risk of fuel starvation, as insufficient fuel, such as hydrogen, is present in the anode of the fuel cell, which may cause irreversible damages of the fuel cell due to anode oxidation.

Thus, tight control of the fuel utilization may play an important role in preventing fuel starvation and improving system efficiency. However, it is difficult to measure the fuel utilization of fuel cell stack, due to the difficulty to measure the recycling flowrate, methane ($CH_4$), Carbon Monoxide (CO), hydrogen ($H_2$), Carbon Dioxide ($CO_2$) and water vapor ($H_2O$) in real time. Although the fuel utilization of the fuel cell system (which is solely defined by electrical current drawn from the fuel cell stack and fuel flow rate provided into the anode recirculation loop) has been used for fuel cell operation and control, the operating boundaries for fuel utilization of the fuel cell system are usually determined by trial and error, due to no explicit relationship between fuel utilization of the fuel cell system and fuel utilization of the fuel cell stack.

Therefore, there is a need for a system to obtain the fuel utilization of the fuel cell stack in real time by using easily measured variable. There is a further need for a system to predict and update the operating boundaries for fuel utilization of fuel cell system in real time. There is still a further need to operate and control the fuel cell system to simultaneously prevent fuel starvation and carbon deposition.

BRIEF DESCRIPTION

In one embodiment, the present disclosure provides a fuel cell system. The fuel cell system comprises an anode recirculation loop, a flowmeter, a current measuring device, a recycle ratio measuring device and a processor. The anode recirculation loop comprises a fuel cell stack for generating power. The flowmeter is configured to measure a fuel flow rate of a fuel provided into the anode recirculation loop. The current measuring device is configured to measure a current drawn from the fuel cell stack. The recycle ratio measuring device is configured to measure a recycle ratio in the anode recirculation loop. The processor is configured to estimate a fuel utilization of the fuel cell stack based on the measured fuel flow rate, the measured current and the measured recycle ratio.

In another embodiment, the present disclosure provides a method for operating a fuel cell system which comprises an anode recirculation loop having a fuel cell stack for generating power. The method comprises: supplying a fuel to the anode recirculation loop; supplying oxygen to a cathode of the fuel cell stack; measuring a fuel flow rate of the fuel provided into the anode recirculation loop; measuring a current drawn from the fuel cell stack; measuring a recycle ratio in the anode recirculation loop; and estimating a fuel utilization of the fuel cell stack based on the measured fuel flow rate, the measured current and the measured recycle ratio.

In still another embodiment, the present disclosure provides a fuel cell system. The fuel cell system comprises an anode recirculation loop, a recycle ratio measuring device and a processor. The anode recirculation loop comprises a fuel cell stack for generating power. A fuel is provided into the anode recirculation loop. The recycle ratio measuring device is configured to measure a recycle ratio in the anode recirculation loop. The processor comprises a fuel utilization model defining a mapping relationship among a fuel utilization of the fuel cell stack, a fuel utilization of the system and the recycle ratio in the anode recirculation loop. The processor is configured to predict a fuel utilization high limit of the system from the fuel utilization model according to the measured recycle ratio and a given fuel utilization high limit of the fuel cell stack.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", "third" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. In addition, the terms "connected" and "coupled" are not restricted to physical or mechanical connections or couplings, and can include electrical connections or couplings, whether direct or indirect.

Fuel Cell System with Anode Recirculation Loop

Figure 1:
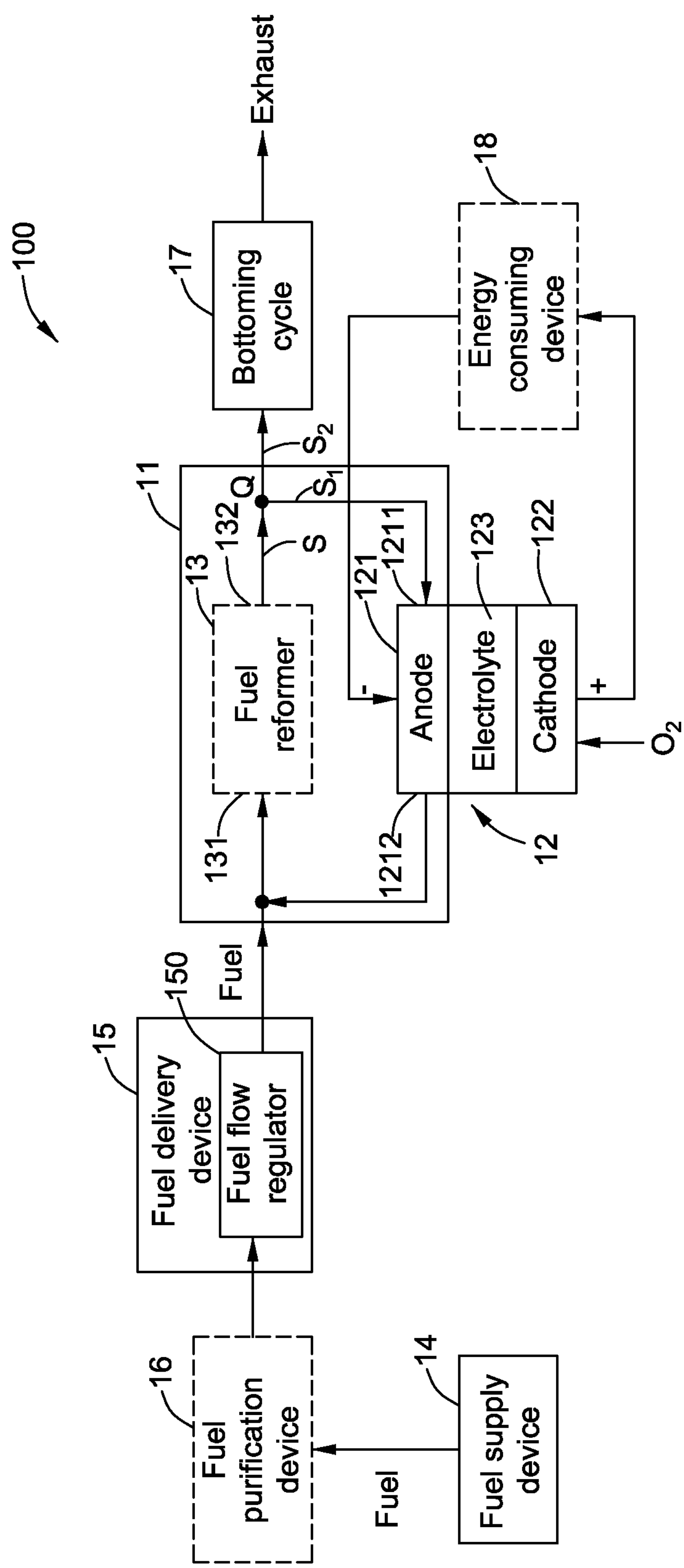
FIG. 1 is a schematic block diagram of an exemplary fuel cell system with an anode recirculation loop.

FIG. 1 illustrates a schematic block diagram of an exemplary fuel cell system 100. As shown in FIG. 1, the exemplary fuel cell system 100 comprises an anode recirculation loop 11. The anode recirculation loop 11 comprises a fuel cell stack 12 for generating power. The fuel cell stack 12 may include a plurality of fuel cells stacked together. The fuel cell stack 12 may be applicable for both high temperature fuel cells, such as a solid oxide fuel cell (SOFC), a molten carbonate fuel cell (MCFC) and etc., and low temperature fuel cells, such as a proton exchange membrane fuel cell (PEMFC), a direct methanol fuel cell (DMFC) and etc.

The fuel cell stack 12 comprises an anode 121, a cathode 122, and an electrolyte 123. The anode 121 of the fuel cell stack 12 has an anode inlet 1211 and an anode outlet 1212.

The anode 121 may support electrochemical reactions that generate electricity. A synthesis gas may be oxidized in the anode 121 with oxygen ions received from the cathode 122 via diffusion through the electrolyte 123. The reactions may create heat, water vapor and electricity in the form of free electrons in the anode 121, which may be used to supply power to an energy consuming device 18. The oxygen ions may be created via an oxygen reduction of a cathode oxidant using the electrons returning from the energy consuming device 18 into the cathode 122.

The energy consuming device 18 is adapted to draw an electric current from, or apply an electrical load to, the fuel cell system 100. The energy consuming device 18 may include, but should not be limited to, tools, lights or lighting assemblies, appliances (such as household or other appliances), households or other dwellings, offices or other commercial establishments, computers, signaling or communication equipment, etc.

The cathode 122 may be coupled to a source of the cathode oxidant, such as oxygen in the atmospheric air. The cathode oxidant is defined as the oxidant that is supplied to the cathode 122 employed by the fuel cell system 100 in generating electrical power. The cathode 122 may be permeable to the oxygen ions received from the cathode oxidant.

The electrolyte 123 may be in communication with the anode 121 and the cathode 122. The electrolyte 123 may be configured to pass the oxygen ions from the cathode 122 to the anode 121, and may have little or no electrical conductivity, so as to prevent passage of the free electrons from the cathode 122 to the anode 121.

The fuel cell system 100 comprises a fuel supply device 14 for providing a fuel and a fuel delivery device 15 for delivering the fuel to the anode recirculation loop 11. The fuel may be gaseous or liquid form. Examples of such fuel may include, but are not limited to, methane, ethane, propane, biogas, natural gas, syngas, diesel, kerosene, gasoline and the like. The fuel delivery device 15 may comprise a fuel flow regulator 150 for regulating a fuel flow rate provided into the anode recirculation loop 11.

In order to decrease or remove concentration of undesirable components such as sulphur in the fuel, which is noxious and tends to bind catalysts used in the later stage of fuel reformation, the fuel cell system 100 may further comprise a fuel purification device 16. The fuel purification device 16 is configured to decrease or remove the concentration of undesirable components from the fuel. However, the fuel purification device 16 may be omitted for pure fuel, such as methane, ethane and propane, etc.

Therefore, the fuel provided into the anode recirculation loop 11 may include the fuel provided by the fuel supply device 14 or the fuel purified by the fuel purification device 16.

In one embodiment, as shown in FIG. 1, the anode recirculation loop 11 may further comprise a fuel reformer 13. The fuel reformer 13 has a reformer inlet 131 and a reformer outlet 132. The anode outlet 1212 of the fuel cell stack 12 may be coupled to the reformer inlet 131 of the fuel reformer 13, and the reformer outlet 132 of the fuel reformer 13 is returned to the anode inlet 1211 of the fuel cell stack 12 so as to form the anode recirculation loop 11.

The fuel reformer 13 may be configured to receive the fuel and a tail gas from the anode outlet 1212 of the fuel cell stack 12 and to generate a reformate S at the reformer outlet 132 from the fuel and the tail gas. The reformate S includes hydrogen ($H_2$) rich gas, and may also include carbon monoxide (CO), carbon dioxide ($CO_2$), water vapor ($H_2O$), and fuel slip, such as methane ($CH_4$). The reformate S at the reformer outlet 132 may be divided into a recirculated reformate $S_1$ and a slip reformate $S_2$ at a splitting position Q. The recirculated reformate $S_1$ is recirculated back to the anode inlet 1211.

When the fuel cell system 100 is in operation, the fuel is supplied to the anode recirculation loop 11, particularly the reformer inlet 131 of the fuel reformer 13 in this embodiment, and oxygen, for example the oxygen contained in the atmospheric air, is supplied to the cathode 122 of the fuel cell stack 12. In the fuel reformer 13, the fuel may be reformed to generate hydrogen through chemical reaction. For example, for a hydrocarbon fuel, the hydrocarbon fuel is converted into carbon monoxide (CO) and hydrogen ($H_2$) by the following steam reforming reaction (1), and carbon monoxide and water vapor ($H_2O$) is converted into carbon dioxide ($CO_2$) and hydrogen by the following water gas shifting reaction (2).

$$C_nH_{2n+2}+nH_2O \leftrightarrow nCO+(2n+1)H_2 \quad (1)$$

$$CO+H_2O \rightarrow CO_2+H_2 \quad (2)$$

Though any hydrocarbon fuel could be used, it is for simplicity to use methane ($CH_4$) as an illustrative example of the fuel hereinafter. When methane ($CH_4$) is used as the fuel, the steam reforming reaction (1) above could be modified as follows:

$$CH_4+H_2O \rightarrow CO+3H_2 \tag{3}$$

The recirculated reformate $S_1$ is returned to the anode inlet 1211 of the fuel cell stack 12. In the anode 121 of the fuel cell stack 12, the recirculated reformate $S_1$ and the oxygen ions from the cathode 122 are mixed, and are converted into water vapor through the following reaction (4) so as to generate power and heat.

$$2H_2+O_2 \rightarrow 2H_2O \tag{4}$$

In another embodiment, the fuel cell stack 12 may have internal reforming function without the separate fuel reformer 13. Under such the circumstance, the anode outlet 1212 of the fuel cell stack 12 may be directly returned to the anode inlet 1211 so as to form the anode recirculation loop 11. Thus, in the anode 121 of the fuel cell stack 12, the steam reforming reaction (1) or (3) and the water gas shifting reaction (2) above will also occur.

With continued reference to FIG. 1, the fuel cell system 100 may further comprise a bottoming cycle 17 including an internal combustion engine. The slip reformate $S_2$ of the reformate S is diverted to the bottoming cycle 17. The internal combustion engine is driven to generate additional electricity for providing increased efficiency of power generation in response to the slip reformate $S_2$, and a redundant portion is discharged as an exhaust from the internal combustion engine.

As discussed in more detail hereinafter, it may be desirable to estimate a fuel utilization (UF) of the fuel cell stack 12 in the fuel cell system 100, and control the fuel cell system 100 based on the estimated fuel utilization of the fuel cell stack 12.

Embodiment 1

Fuel Utilization Estimation of Fuel Cell Stack

Figure 2:
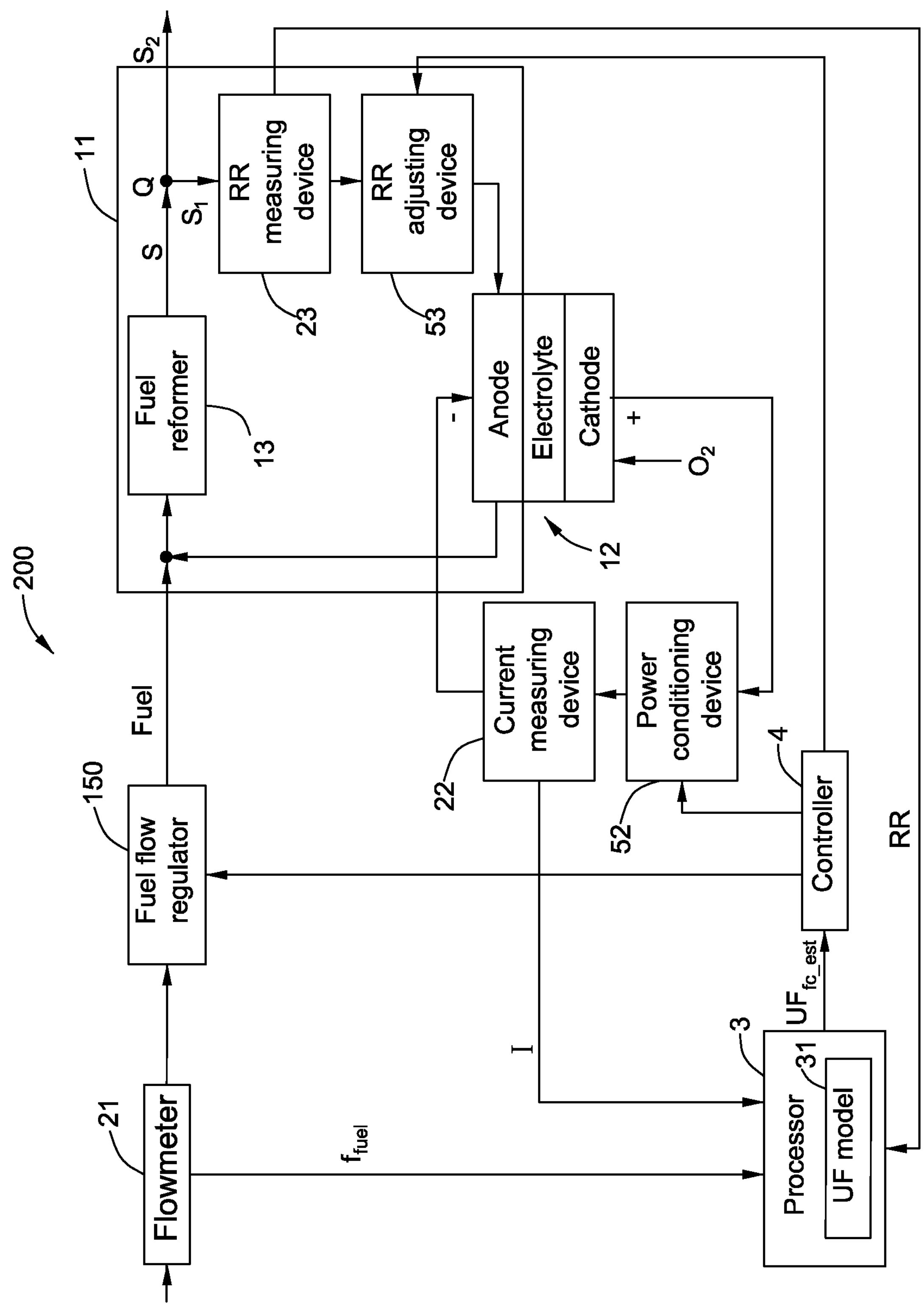
FIG. 2 is a schematic block diagram of a fuel cell system in accordance with an embodiment of the present disclosure.

FIG. 2 illustrates a schematic block diagram of a fuel cell system 200 in accordance with an embodiment of the present disclosure. With reference to FIG. 2, in comparison to FIG. 1, the fuel cell system 200 in accordance with the embodiment of the present disclosure may further comprise a flowmeter 21, a current measuring device 22, a recycle ratio (RR) measuring device 23 and a processor 3. The flowmeter 21 may measure a fuel flow rate $f_{fuel}$ provided into the anode recirculation loop 11. The current measuring device 22 may measure a current I drawn from the fuel cell stack 12. The RR measuring device 23 may measure a recycle ratio RR in the anode recirculation loop 11. The details about the RR measuring device 23 may refer to US Patent Publication No. US 20160104906 A1, contents of which are incorporated hereby by reference. The recycle ratio RR in the anode recirculation loop 11 is defined as a flow rate ratio of the recirculated reformate $S_1$ to the reformate S. The processor 3 may estimate a fuel utilization $UF_{fc\_est}$ of the fuel cell stack 12 in real time based on the measured fuel flow rate $f_{fuel}$, the measured current I and the measured recycle ratio RR.

In one embodiment, the processor 3 may calculate the fuel utilization $UF_{sys}$ of the system 200 based on the measured fuel flow rate $f_{fuel}$, the measured current I and a number of fuel cells of the fuel cell stack 12 according to the following equations:

$$UF_{sys} = \frac{I \times N}{f_{fuel} \times 8 \times F} \tag{5}$$

$$F = 96485 C/\text{mol} \tag{6}$$

Wherein $UF_{sys}$ represents the fuel utilization of the system 200, I represents the current drawn from the fuel cell stack 12, N represents the number of the fuel cells of the fuel cell stack 12, $f_{fuel}$ represents the fuel flow rate provided into the anode recirculation loop 11, and F represents the Faraday constant.

The processor 3 may include a fuel utilization (UF) model 31. The UF model 31 may define a mapping relationship among a fuel utilization $UF_{fc}$ of the fuel cell stack 12, a fuel utilization $UF_{sys}$ of the system 200 and a recycle ratio RR in the anode recirculation loop 11.

The processor 3 may determine the fuel utilization $UF_{fc\_est}$ of the fuel cell stack 12 from the UF model 31 according to the calculated fuel utilization $UF_{sys}$ of the system 200 and the measured recycle ratio RR.

As an example, the UF model 241 may include the following equation:

$$UF_{fc} = \frac{UF_{sys}}{1 - UF_{sys}} \times \frac{1 - RR}{RR} \tag{7}$$

Therefore, as long as the fuel flow rate $f_{fuel}$ provided into the anode recirculation loop 11, the current I drawn from the fuel cell stack 12, and the recycle ratio RR in the anode recirculation loop 11 are measured, the fuel utilization $UF_{fc\_est}$ of the fuel cell stack 12 can be easily estimated according to the equations (5)-(7) above.

The effectiveness of the equation (7) above can be demonstrated by the following comparative tests against a high fidelity first-principle computer model (see Table 1). The testing data was generated in the fuel cell system 200 by varying the recycle ratio RR in the anode recirculation loop 11, the current I drawn from the fuel cell stack 12 and the methane flow rate $f_{CH_4}$ provided into the reformer inlet 131 of the anode recirculation loop 11 in the condition that the fuel cell stack 12 is in 800° C. temperature.

TABLE 1

| $T_{stack}$ (° C.) | RR | I (Amps) | $f_{CH_4}$ (kg/hr) | $UF_{sys}$ | $UF_{fc\_est}$ | $UF_{fc\_sim}$ | RE (%) |
|---|---|---|---|---|---|---|---|
| 800 | 0.77 | 92.2 | 7.6 | 0.597 | 0.443 | 0.436 | 2% |
| 800 | 0.77 | 99.3 | 7.6 | 0.644 | 0.539 | 0.543 | −1% |
| 800 | 0.77 | 102 | 7.6 | 0.661 | 0.582 | 0.587 | −1% |
| 800 | 0.77 | 105 | 7.6 | 0.680 | 0.636 | 0.641 | −1% |
| 800 | 0.77 | 105 | 7.6 | 0.700 | 0.697 | 0.703 | −1% |
| 800 | 0.77 | 105 | 7.6 | 0.750 | 0.896 | 0.905 | −1% |
| 800 | 0.8 | 117 | 10 | 0.576 | 0.340 | 0.342 | −1% |
| 800 | 0.8 | 129 | 10 | 0.635 | 0.436 | 0.440 | −1% |
| 800 | 0.8 | 138 | 10 | 0.680 | 0.530 | 0.535 | −1% |
| 800 | 0.8 | 145 | 10 | 0.714 | 0.625 | 0.630 | −1% |
| 800 | 0.8 | 145 | 10 | 0.750 | 0.750 | 0.758 | −1% |
| 800 | 0.82 | 129 | 10 | 0.635 | 0.382 | 0.386 | −1% |
| 800 | 0.82 | 135 | 10 | 0.665 | 0.436 | 0.439 | −1% |
| 800 | 0.82 | 143 | 10 | 0.704 | 0.523 | 0.527 | −1% |
| 800 | 0.82 | 150 | 10 | 0.739 | 0.621 | 0.627 | −1% |
| 800 | 0.82 | 150 | 10 | 0.800 | 0.878 | 0.883 | −1% |

Wherein $T_{stack}$ represents a temperature of the fuel cell stack 12, $UF_{fc\_est}$ represents an estimated fuel utilization of the fuel cell stack 12 from the equation (7), $UF_{fc\_sim}$ represents a simulated fuel utilization of the fuel cell stack 12 from the high fidelity first-principle computer model, and RE represents a relative error between the estimated fuel utilization $UF_{fc\_est}$ and the simulated fuel utilization $UF_{fc\_sim}$. From Table 1 above, the average absolute relative error is 1.2%, while the maximal absolute relative error is 2% which is below an engineering standard error (for example 5%) in the fuel cell industry. Thus, the comparative result indicates that the prediction from the equation (7) may agree well with the result from the high fidelity first-principle computer model.

According to a lot of simulation testing data, the equation (7) above may be approximately expressed as the following regression equation:

$$UF_{fc} \approx 1.41 + 2.19 \times UF_{sys} - 2.95RR \tag{8}$$

Fuel Starvation Prevention Based on Estimated Fuel Utilization of Fuel Cell Stack With continued reference to FIG. 2, in order to make better use of the estimated fuel utilization $UF_{fc\_est}$ of the fuel cell stack 12 to prevent fuel starvation in the fuel cell system 200, the fuel cell system 200 may further comprise a controller 4. The controller 4 may control the fuel cell system 200 based on the estimated fuel utilization $UF_{fc\_est}$ of the fuel cell stack 12. A fuel utilization high limit of the fuel cell stack 12 and a fuel utilization low limit of the fuel cell stack 12 may be pre-stored in the controller 4.

Controlling the fuel cell system 200 may include adjusting parameters of the fuel cell system 200.

For example, in one embodiment, when the estimated fuel utilization $UF_{fc\_est}$ of the fuel cell stack 12 is close to the fuel utilization high limit of the fuel cell stack 12, the controller 4 may send an adjusting command to the fuel flow regulator 150 of the fuel cell system 200. The fuel flow regulator 150 may increase the fuel flow rate $f_{fuel}$ provided into the anode recirculation loop 11 in response to the adjusting command so as to prevent fuel starvation. When the estimated fuel utilization $UF_{fc\_est}$ of the fuel cell stack 12 is close to the fuel utilization low limit of the fuel cell stack 12, the controller 4 may control the fuel flow regulator 150 to decrease the fuel flow rate $f_{fuel}$ provided into the anode recirculation loop 11.

In another embodiment, the fuel cell system 200 of the present disclosure may further comprise a power conditioning device 52. The power conditioning device 52 may be used to connect the fuel cell stack 12 to the energy consuming device 18 (as shown in FIG. 1). The power conditioning device 52 may for example, include a DC-DC converter, a DC-AC inverter, or the combination of the DC-DC converter and DC-AC inverter. When the estimated fuel utilization $UF_{fc\_est}$ of the fuel cell stack 12 is close to the fuel utilization high limit of the fuel cell stack 12, the controller 4 may send an adjusting command to the power conditioning device 52. The power conditioning device 52 may decrease the current I drawn from the fuel cell stack 12 in response to the adjusting command so as to prevent fuel starvation. When the estimated fuel utilization $UF_{fc\_est}$ of the fuel cell stack 12 is close to the fuel utilization low limit of the fuel cell stack 12, the controller 4 may control the power conditioning device 52 to increase the current I drawn from the fuel cell stack 12.

In still another embodiment, the fuel cell system 200 of the present disclosure may further comprise a recycle ratio (RR) adjusting device 53. When the estimated fuel utilization $UF_{fc\_est}$ of the fuel cell stack 12 is close to the fuel utilization high limit of the fuel cell stack 12, the controller 4 may send an adjusting command to the RR adjusting device 53. The RR adjusting device 53 may increase the recycle ratio RR in the anode recirculation loop 11 in response to the adjusting command so as to prevent fuel starvation. When the estimated fuel utilization $UF_{fc\_est}$ of the fuel cell stack 12 is close to the fuel utilization low limit of the fuel cell stack 12, the controller 4 may control the RR adjusting device 53 to decrease the recycle ratio RR in the anode recirculation loop 11. The RR adjusting device 53 may be for example, an anode blower or a flow control valve at an exhaust line at $S_2$. The recycle ratio RR can be regulated by adjusting anode blower speed or flow control valve opening.

When the estimated fuel utilization $UF_{fc\_est}$ of the fuel cell stack 12 is close to the fuel utilization high limit or low limit of the fuel cell stack 12, the controller 4 may also control one or more of the fuel flow regulator 150, the power conditioning device 52 and the RR adjusting device 53 so as to prevent fuel starvation.

Certainly, controlling the fuel cell system 200 may also include only monitoring the fuel cell system 200. For example, when the estimated fuel utilization $UF_{fc\_est}$ of the fuel cell stack 12 is close to the fuel utilization high limit or low limit of the fuel cell stack 12, the controller 4 may only generate a warning signal in an operator interface (for example, human machine interface) or send a notification via an email or text message to a system operator, so as to inform the system operator to take corresponding actions to prevent fuel starvation.

The controller 4 of the present disclosure may be a multi-core controller. The processor 3 may be integrated into the controller 4.

The fuel cell system 200 of the present disclosure may estimate the fuel utilization $UF_{fc\_est}$ of the fuel cell stack 12 easily and in real time using the fuel flow rate $f_{fuel}$ provided into the anode recirculation loop 11, the current I drawn from the fuel cell stack 12, and the recycle ratio RR in the anode recirculation loop 11. Furthermore, the fuel cell system 200 of the present disclosure may be well controlled according to the estimated fuel utilization $UF_{fc\_est}$ of the fuel cell stack 12, so fuel starvation of the fuel cell system 200 may be effectively prevented. The real time estimated fuel utilization $UF_{fc\_est}$ of the fuel cell stack 12 of the present disclosure may improve observability of operation and improve device health during operation without using additional expensive gas analyzer or separation process, which enables the fuel cell system 200 of the present disclosure to have high reliability and flexibility, and low operating cost.

Method for Operating Fuel Cell System

Figure 3:
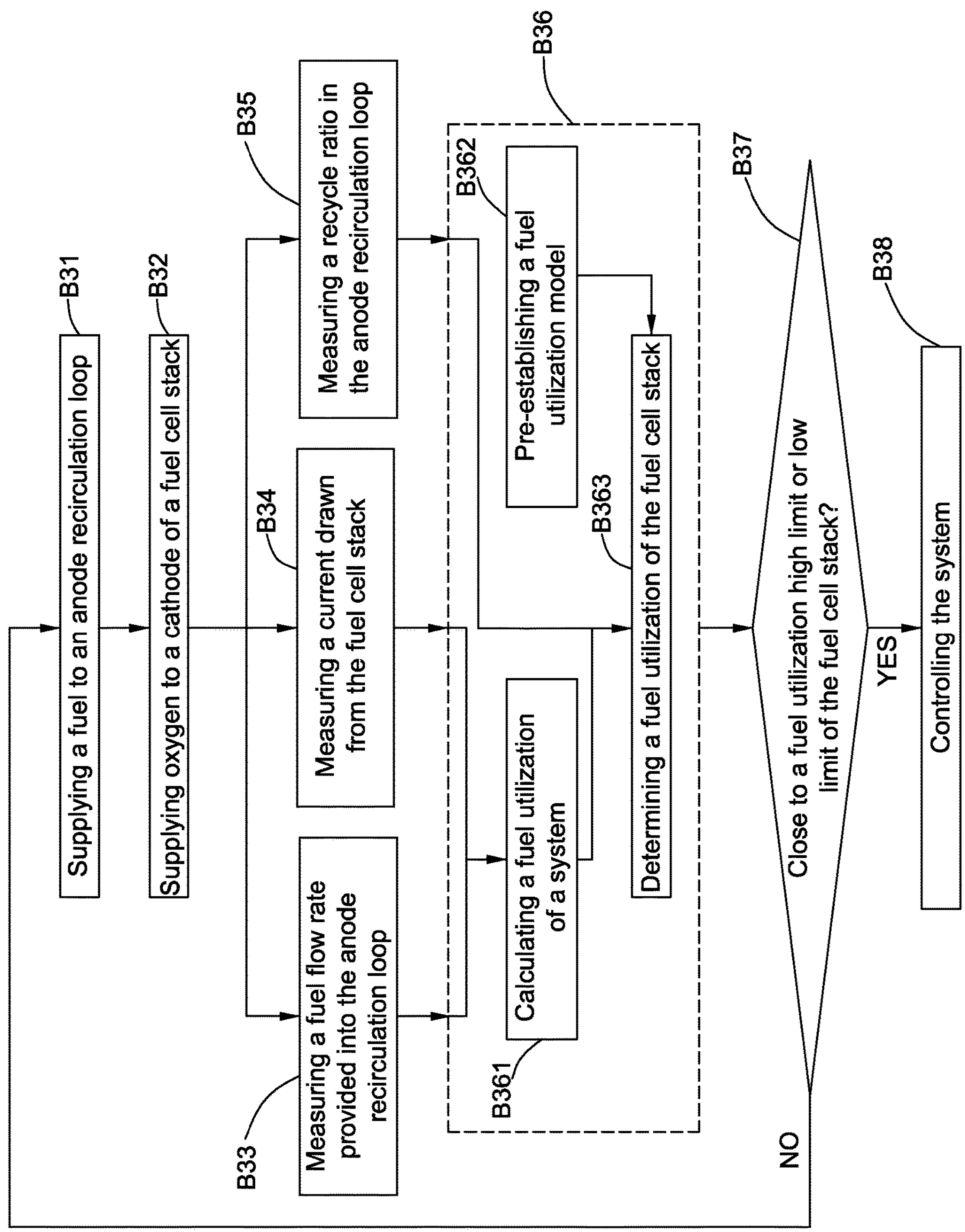
FIG. 3 is a flow chart of an exemplary method for operating a fuel cell system in accordance with an embodiment of the present disclosure.

FIG. 3 illustrates a flow chart of a method for operating the fuel cell system 200 in accordance with an embodiment of the present disclosure.

As shown in FIG. 3, in block B31, a fuel, for example a hydrocarbon fuel such as methane, may be supplied to an anode recirculation loop 11 of the fuel cell system 200. The fuel provided into the anode recirculation loop 11 in the present disclosure may include the fuel provided by a fuel supply device 14 or the fuel purified by a fuel purification device 16. In one embodiment, the anode recirculation loop 11 may further comprise a fuel reformer 13. The fuel may be provided to a reformer inlet 131 of the fuel reformer 13.

In block B32, oxygen, for example the oxygen contained in the atmospheric air, may be supplied to a cathode 122 of a fuel cell stack 12 of the anode recirculation loop 11. The fuel reformer 13 receives the fuel and a tail gas from an anode outlet 1212 of the fuel cell stack 12 and generates a reformate S. A recirculated reformate $S_1$ of the reformate S may be then returned to an anode inlet 1211 of the fuel cell stack 12. In the anode 121 of the fuel cell stack 12, the recirculated reformate $S_1$ and the oxygen ions from the cathode 122 may be mixed and are converted into water vapor so as to generate power.

In block B33, a fuel flow rate $f_{fuel}$ of the fuel (for example, methane flow rate $f_{CH_4}$) provided into the anode recirculation loop 11 may be measured, for example, by using a flowmeter 21.

In block B34, a current I drawn from the fuel cell stack 12 may be measured, for example, by using a current measuring device 22.

In block B35, a recycle ratio RR in the anode recirculation loop 11 may be measured, for example, by using a recycle ratio (RR) measuring device 23.

In block B36, a fuel utilization $UF_{fc\_est}$ of the fuel cell stack 12 may be estimated based on the measured fuel flow rate $f_{fuel}$ in block B33, the measured current I in block B34 and the measured recycle ratio RR in block B35.

Hereinafter, how to estimate the fuel utilization $UF_{fc\_est}$ of the fuel cell stack 12 in block B36 will be described in detail with continued reference to FIG. 3.

In block B361, the fuel utilization $UF_{sys}$ of the system 200 may be calculated based on the measured fuel flow rate $f_{fuel}$, the measured current I and a number N of fuel cells of the fuel cell stack 12 according to the equation (5) above.

In block B362, a fuel utilization (UF) model 31 may be pre-established. The UF model 31 may define a mapping relationship among a fuel utilization $UF_{fc}$ of the fuel cell stack 12, a fuel utilization $UF_{sys}$ of the system 200 and a recycle ratio RR in the anode recirculation loop 11.

In block B363, the fuel utilization $UF_{fc\_est}$ of the fuel cell stack 12 may be determined from the UF model 31 according to the calculated fuel utilization $UF_{sys}$ of the system 200 and the measured recycle ratio RR.

Block B37 may determine whether the estimated fuel utilization $UF_{fc\_est}$ of the fuel cell stack 12 is close to a fuel utilization high limit or low limit of the fuel cell stack 12. When the estimated fuel utilization $UF_{fc\_est}$ of the fuel cell stack 12 is close to the fuel utilization high limit or low limit of the fuel cell stack 12, the process may go to block B38. If not, the process may be returned to block B31.

In block B38, the fuel cell system 200 may be controlled based on the estimated fuel utilization $UF_{fc\_est}$ of the fuel cell stack 12. In one embodiment, controlling the fuel cell system 200 may include only monitoring the fuel cell system 200. For example, when the estimated fuel utilization $UF_{fc\_est}$ of the fuel cell stack 12 is close to the fuel utilization high limit or low limit of the fuel cell stack 12, a warning signal may be generated in an operator interface, or a notification may be sent via an email or text message to a system operator, so as to inform the system operator to take actions to control the fuel utilization of the fuel cell stack 12. In another embodiment, controlling the fuel cell system 200 may include adjusting parameters of the fuel cell system 200. For example, when the estimated fuel utilization $UF_{fc\_est}$ of the fuel cell stack 12 is close to the fuel utilization high limit or low limit of the fuel cell stack 12, one or more of the fuel flow rate $f_{fuel}$ provided into the anode recirculation loop 11, the current I drawn from the fuel cell stack 12 and the recycle ratio RR in the anode recirculation loop 11 may be adjusted.

The method for operating the fuel cell system 200 of the present disclosure may improve observability of operation and improve device performance during operation, which enables the fuel cell system 200 of the present disclosure to have high reliability and flexibility, and have low operating cost.

Embodiment 2

Fuel Utilization High Limit Prediction of Fuel Cell System

The present disclosure may further provide a fuel cell system 300 of another embodiment. The fuel cell system 300 may have most of structure features of the fuel cell system 200 as shown in FIG. 2. For example, similarly, the fuel cell system 300 may include an anode recirculation loop 11 having a fuel cell stack 12 for generating power, and a recycle ratio (RR) measuring device 23 for measuring a recycle ratio RR in the anode recirculation loop 11.

Figure 4:
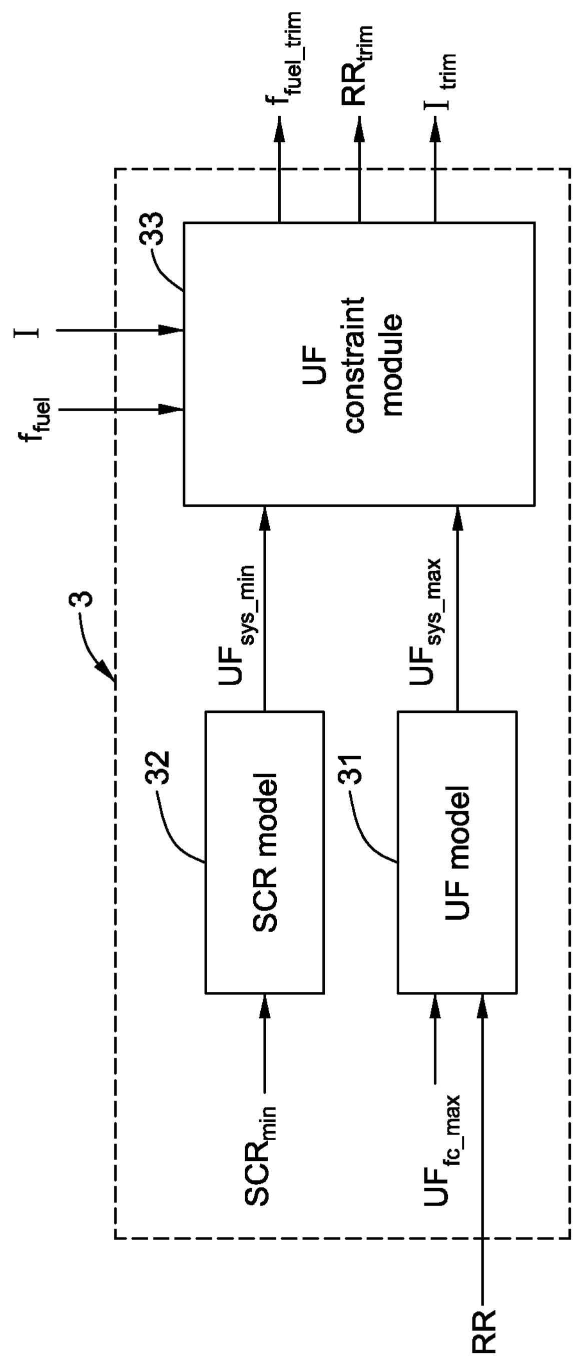
FIG. 4 is a schematic diagram of a processor in accordance with another embodiment of the present disclosure.

But different from the fuel cell system 200, the fuel cell system 300 may include a processor 3 of another embodiment. FIG. 4 illustrates a schematic diagram of the processor 3 of another embodiment. As shown in FIG. 4, the processor 3 may include a fuel utilization (UF) model 31. The UF model 31 may define a mapping relationship among the fuel utilization $UF_{fc}$ of the fuel cell stack 12, a fuel utilization $UF_{sys}$ of the system 300 and the recycle ratio RR in the anode recirculation loop 11. For example, the UF model 31 may comprise the equation (7) above. The processor 3 may predict a fuel utilization high limit of the system 300 from the UF model 31 according to the measured recycle ratio RR and a given fuel utilization high limit of the fuel cell stack 12 (as shown in the following equation).

$$UF_{sys\_max} = \frac{UF_{fc\_max} \times RR}{1 - RR \times (1 - UF_{fc\_max})} \tag{9}$$

Wherein $UF_{sys\_max}$ represents the fuel utilization high limit of the system 300, $UF_{fc\_max}$ represents the given fuel utilization high limit of the fuel cell stack 12, and RR represents the measured recycle ratio in the anode recirculation loop 11.

Therefore, as long as the fuel utilization high limit $UF_{fc\_max}$ of the fuel cell stack 12 is given and the recycle ratio RR in the anode recirculation loop 11 is measured, the fuel utilization high limit $UF_{sys\_max}$ of the system 300 can be easily predicted according to the equation (9) above.

Fuel Utilization Low Limit Prediction of Fuel Cell System

With continued reference to FIG. 4, the processor 3 may further include a steam to carbon ratio (SCR) model 32. The SCR model 32 may define a mapping relationship between the fuel utilization $UF_{sys}$ of the system 300 and a steam to carbon ratio SCR in the anode recirculation loop 11. The definition about the steam to carbon ratio SCR in the anode recirculation loop 11 may refer to Chinese Patent Application No. 201510962881.X, contents of which are incorporated hereby by reference.

As an example, the SCR model 32 may include the following equation:

$$UF_{sys} = \frac{SCR + 8.04}{17.3} \tag{10}$$

Therefore, as long as a steam to carbon ratio low limit in the anode recirculation loop 11 is given, the processor 3 may easily predict a fuel utilization low limit of the system 300 from the SCR model 32 according to the given steam to carbon ratio low limit in the anode recirculation loop 11 (as shown in the following equation).

$$UF_{sys\_min} = \frac{SCR_{min} + 8.04}{17.3} \quad (11)$$

Wherein $UF_{sys\_min}$ represents the fuel utilization low limit of the system 300, and $SCR_{min}$ represents the given steam to carbon ratio low limit in the anode recirculation loop 11.

In an exemplary embodiment, in the condition that the given steam to carbon ratio low limit $SCR_{min}$ in the anode recirculation loop 11 is 2, the given fuel utilization high limit $UF_{fc\_max}$ of the fuel cell stack 12 is 80%, and a voltage of the fuel cell is 0.6V, and based on the measured different recycle ratio RR in the anode recirculation loop 11, the fuel utilization low limit $UF_{sys\_min}$ of the system 300 and the fuel utilization high limit $UF_{sys\_max}$ of the system 300 can be respectively obtained according to the equations (10) and (9) (see Table 2).

TABLE 2

| $SCR_{min}$ | $UF_{fc\_max}$ | $V_{cell}$ | RR | $UF_{sys\_min}$ | $UF_{sys\_max}$ |
|---|---|---|---|---|---|
| 2 | 80% | 0.6V | 0.70 | 58.60% | 65.12% |
| | | | 0.73 | | 68.38% |
| | | | 0.75 | | 70.59% |
| | | | 0.77 | | 72.81% |
| | | | 0.80 | | 76.19% |
| | | | 0.85 | | 81.93% |

Fuel Starvation Prevention Based on Predicted Fuel Utilization High Limit of System Similarly, the fuel cell system 300 may further include a flowmeter 21 for measuring a fuel flow rate $f_{fuel}$ of the fuel provided into the anode recirculation loop 11, a current measuring device 22 for measuring a current I drawn from the fuel cell stack 12, and a controller 4.

The processor 3 may calculate a fuel utilization $UF_{sys}$ of the system 300 based on the measured fuel flow rate $f_{fuel}$, the measured current I and a number N of fuel cells of the fuel cell stack 12 according to the equation (5) above.

Based on the predicted fuel utilization high limit $UF_{sys\_max}$ of the system 300 and the calculated fuel utilization $UF_{sys}$ of the system 300, the controller 4 may control the system 300 to prevent fuel starvation.

Fuel Starvation and Carbon Deposition Prevention Based on Predicted Fuel Utilization High Limit of System and Predicted Fuel Utilization Low Limit of System Based on the predicted fuel utilization high limit $UF_{sys\_max}$ of the system 300, the predicted fuel utilization low limit $UF_{sys\_min}$ of the system 300 and the calculated fuel utilization $UF_{sys}$ of the system 300, the controller 4 may also control the system 300 to prevent fuel starvation and carbon deposition.

With continued reference to FIG. 4, the processor 3 may further include a fuel utilization (UF) constraint module 33. The UF constraint module 33 may determine one or more trims of a fuel flow rate trim $f_{fuel\_trim}$, a current trim $I_{trim}$ and a recycle ratio trim $RR_{trim}$ based on the predicted fuel utilization high limit $UF_{sys\_max}$ of the system 300, the predicted fuel utilization low limit $UF_{sys\_min}$ of the system 300 and the calculated fuel utilization $UF_{sys}$ of the system 300.

The controller 4 may control the system 300 based on the one or more determined trims $f_{fuel\_trim}$, $I_{trim}$, $RR_{trim}$. For example, the controller 4 may correct one or more corresponding setpoints of a fuel flow rate setpoint $f_{fuel\_sp}$, a current setpoint $I_{sp}$ and a recycle ratio setpoint $RR_{sp}$ by using the one or more determined trims $f_{fuel\_trim}$, $I_{trim}$, $RR_{trim}$, and control the system 300 based on one or more corrected setpoints.

Figure 5:
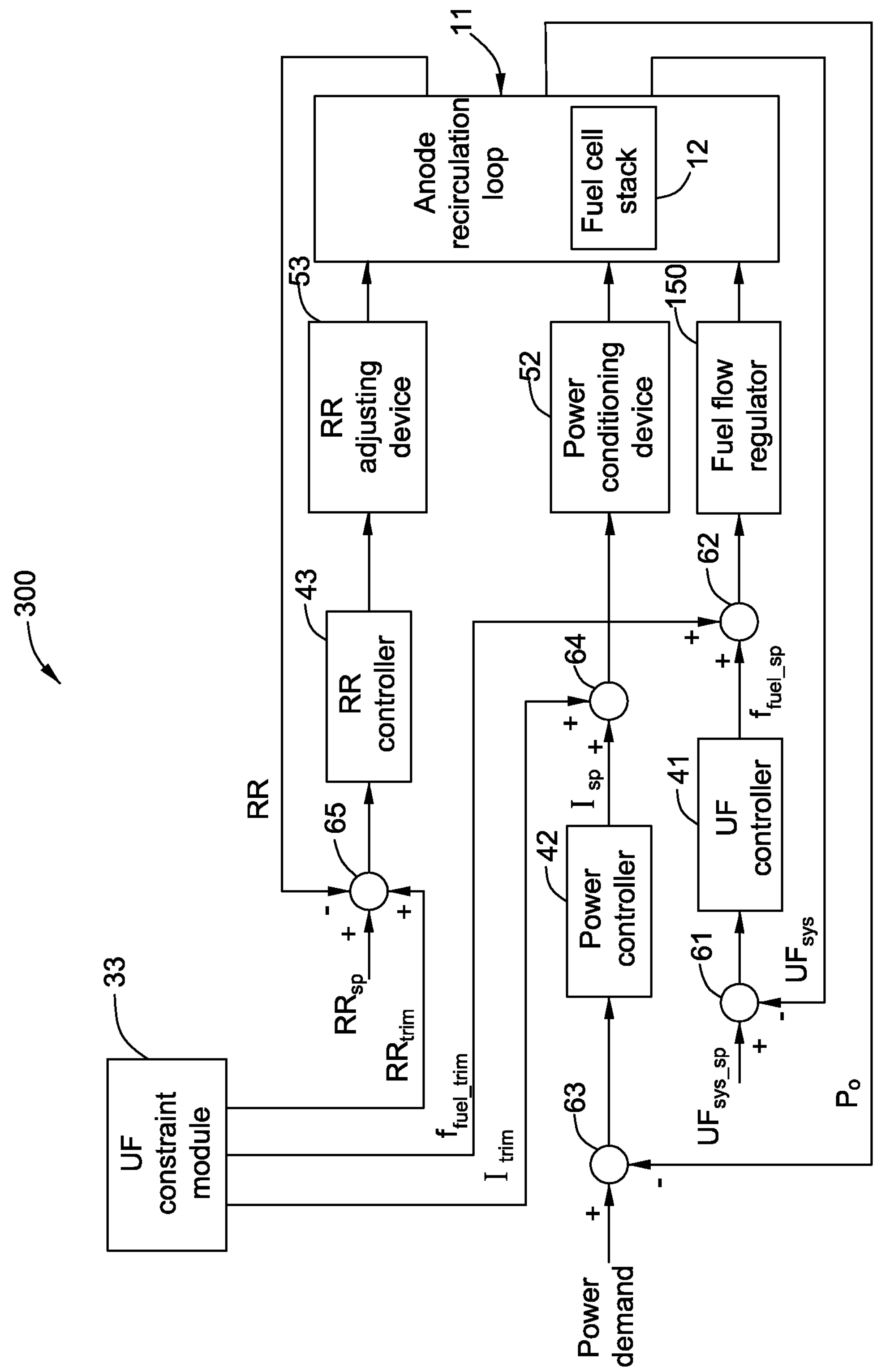
FIG. 5 is a schematic block diagram of a fuel cell system in accordance with another embodiment of the present disclosure.

Referring to FIG. 5, the fuel cell system 300 may include a fuel flow regulator 150, a power conditioning device 52 and a recycle ratio (RR) adjusting device 53. The controller 4 includes a fuel utilization (UF) controller 41, a power controller 42 and a recycle ratio (RR) controller 43.

In one embodiment, a fuel utilization setpoint $UF_{sys\_sp}$ of the system 300 and the calculated fuel utilization $UF_{sys}$ of the system 300 may be input to a subtractor 61 and may be then input to the UF controller 41 to obtain a fuel flow rate setpoint $f_{fuel\_sp}$. The fuel flow rate setpoint $f_{fuel\_sp}$ and the determined fuel flow rate trim $f_{fuel\_trim}$ may be input to an adder 62. The adder 62 may add the determined fuel flow rate trim $f_{fuel\_trim}$ to the fuel flow rate setpoint $f_{fuel\_sp}$ so as to obtain a corrected fuel flow rate setpoint, which may be sent to the fuel flow regulator 150. The fuel flow regulator 150 may regulate the fuel flow rate $f_{fuel}$ provided into the anode recirculation loop 11 based on the corrected fuel flow rate setpoint.

In another embodiment, a power demand and an output power $P_o$ measured from the fuel cell stack 12 may be input to a subtractor 63 and may be then input to the power controller 42 to obtain a current setpoint $I_{sp}$. The power demand may for example come from a power grid or an electrical load. The current setpoint $I_{sp}$ and the determined current trim $I_{trim}$ may be input to an adder 64. The adder 64 may add the determined current trim $I_{trim}$ to the current setpoint $I_{sp}$ so as to obtain a corrected current setpoint, which may be sent to the power conditioning device 52. The power conditioning device 52 may adjust the current I drawn from the fuel cell stack 12 based on the corrected current setpoint.

In still another embodiment, a recycle ratio setpoint $RR_{sp}$, the determined recycle ratio trim $RR_{trim}$ and the measured recycle ratio RR may be input to an adder-subtractor 65. The adder-subtractor 65 may add the determined recycle ratio trim $RR_{trim}$ to the recycle ratio setpoint $RR_{sp}$ to obtain a corrected recycle ratio setpoint and subtract the measured recycle ratio RR from the corrected recycle ratio setpoint, which may be sent to the RR controller 43. The RR controller 43 may control the RR adjusting device 53 to adjust the recycle ratio RR in the anode recirculation loop 11.

The fuel cell system 300 of the present disclosure may perform a trim adjustment once the operational variable of the system 300, that is, the fuel utilization $UF_{sys}$ of the system 300 is close to or beyond a constraint boundary defined in advance, so the fuel cell system 300 of the present disclosure may be ensured to operate within the constraint boundary and improve device health during operation.

Method for Operating Fuel Cell System

Figure 6:
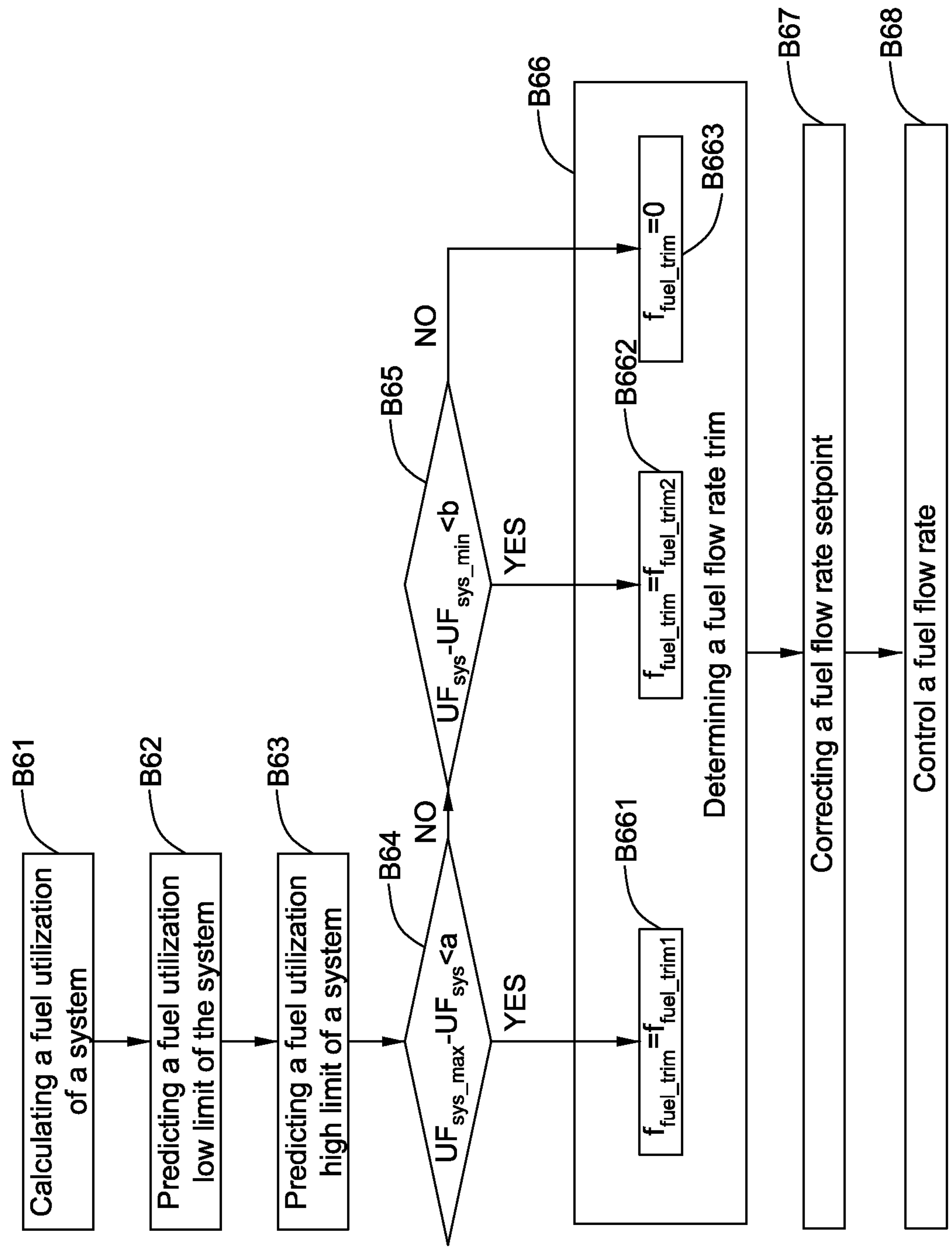
FIG. 6 is a flow chart of an exemplary method for operating a fuel cell system in accordance with another embodiment of the present disclosure.

FIG. 6 illustrates a flow chart of an exemplary method for operating the fuel cell system 300 in accordance with another embodiment of the present disclosure.

As shown in FIG. 6, in block B61, a fuel utilization $UF_{sys}$ of the system 300 may be calculated based on a measured fuel flow rate $f_{fuel}$ provided into the anode recirculation loop 11, a measured current I drawn from the fuel cell stack 12 and a number N of fuel cells of the fuel cell stack 12 according to the equation (5) above.

In block B62, a fuel utilization low limit $UF_{sys\_min}$ of the system 300 may be predicted from a steam to carbon ratio (SCR) model 32 based on a given steam to carbon ratio low limit $SCR_{min}$ in the anode recirculation loop 11 according to the equation (11) above.

In block B63, a fuel utilization high limit $UF_{sys\_max}$ of the system 300 may be predicted from a fuel utilization (UF) model 31 based on a measured recycle ratio RR in the anode recirculation loop 11 and a given fuel utilization high limit $UF_{fc\_max}$ of the fuel cell stack 12 according to the equation (9) above.

Block B64 may determine whether a difference between the predicted fuel utilization high limit $UF_{sys\_max}$ of the system 300 and the calculated fuel utilization $UF_{sys}$ of the system 300 is less than a first threshold, as shown in the following equation (12). In the equation (12), a represents the first threshold.

$$UF_{sys\_max}-UF_{sys}<a \quad (12)$$

Block B65 may determine whether a difference between the calculated fuel utilization $UF_{sys}$ of the system 300 and the predicted fuel utilization low limit $UF_{sys\_min}$ of the system 300 is less than a second threshold, as shown in the following equation (13). In the equation (13), b represents the second threshold.

$$UF_{sys}-UF_{sys\_min}<b \quad (13)$$

The first and the second thresholds a, b may be determined according to total uncertainty of the fuel utilization $UF_{sys}$ of the system 300.

In block B66, one or more trims of a fuel flow rate trim $f_{fuel\_trim}$, a current trim $I_{trim}$ and a recycle ratio trim $RR_{trim}$, for example, a fuel flow rate trim $f_{fuel\_trim}$ may be determined according to the determined result.

In block B661, when the difference between the predicted fuel utilization high limit $UF_{sys\_max}$ of the system 300 and the calculated fuel utilization $UF_{sys}$ of the system 300 is less than the first threshold a, the determined fuel flow rate trim $f_{fuel\_trim}$ may be expressed as follows:

$$f_{fuel\_trim}=f_{fuel\_trim1}=\frac{1\times N}{\text{abs}(UF_{sys}-UF_{sys\_max})\times 8\times F} \quad (14)$$

In block B662, when the difference between the calculated fuel utilization $UF_{sys}$ of the system 300 and the predicted fuel utilization low limit $UF_{sys\_min}$ of the system 300 is less than the second threshold b, the determined fuel flow rate trim $f_{fuel\_trim}$ may be expressed as follows:

$$f_{fuel\_trim}=f_{fuel\_trim2}=-\frac{1\times N}{\text{abs}(UF_{sys}-UF_{sys\_min})\times 8\times F} \quad (15)$$

In block B663, when the difference between the predicted fuel utilization high limit $UF_{sys\_max}$ of the system 300 and the calculated fuel utilization $UF_{sys}$ of the system 300 is not less than the first threshold a, and the difference between the calculated fuel utilization $UF_{sys}$ of the system 300 and the predicted fuel utilization low limit $UF_{sys}$ min of the system 300 is not less than the second threshold b, the determined fuel flow rate trim $f_{fuel\_trim}$ may be expressed as follows:

$$f_{fuel\_trim}=0 \quad (16)$$

In block B67, a fuel flow rate setpoint $f_{fuel\_sp}$ may be corrected based on the determined fuel flow rate trim $f_{fuel\_trim}$. As an example, the determined fuel flow rate trim $f_{fuel\_trim}$ may be added to the fuel flow rate setpoint $f_{fuel\_sp}$ so as to obtain a corrected fuel flow rate setpoint.

In block B68, a fuel flow rate $f_{fuel}$ provided into the anode recirculation loop 11 may be controlled based on the corrected fuel flow rate setpoint.

Although the fuel flow rate trim $f_{fuel\_trim}$ is used as an illustrative example of one or more trims in the above method, the above method may be similarly applied to the current trim $I_{trim}$ and the recycle ratio trim $RR_{trim}$.

The method of the present disclosure may effectively prevent both fuel starvation and carbon deposition and solve the two key constraints by limited adjustable variables such as the fuel flow rate $f_{fuel}$ provided into the anode recirculation loop 11, the current I drawn from the fuel cell stack 12 and the recycle ratio RR in the anode recirculation loop 11.

While steps of the methods for operating the fuel cell system 200, 300 in accordance with embodiments of the present disclosure are illustrated as functional blocks, the order of the blocks and the separation of the steps among the various blocks shown in FIGS. 3 and 6 are not intended to be limiting. For example, the blocks may be performed in a different order and a step associated with one block may be combined with one or more other blocks or may be subdivided into a number of blocks.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating a fuel cell system for generating power, the method comprising:

supplying to a fuel reformer of an anode recirculation loop, a fuel from a fuel supply device and a tail gas from an anode outlet of an anode of a fuel cell stack;

receiving a reformate at a reformer outlet of the fuel reformer, wherein the reformate is divided into a recirculated reformate and a slip reformate, and wherein the recirculated reformate is recirculated back to the anode inlet of the anode;

measuring a fuel flow rate of the fuel provided into a reformer inlet of the fuel reformer;

measuring a current drawn from the fuel cell stack by an electrical load;

measuring a recycle ratio in the anode recirculation loop defined as a flow rate ratio of the recirculated reformate to the reformate; and estimating a fuel utilization of the fuel cell stack based on the measured fuel flow rate, the measured current and the measured recycle ratio; and controlling the fuel cell system based on the estimated fuel utilization of the fuel cell stack.

2. The method of claim 1, wherein estimating the fuel utilization of the fuel cell stack comprises:

calculating the fuel utilization of the fuel cell system based on the measured fuel flow rate, the measured current and a number of fuel cells of the fuel cell stack and determining the fuel utilization of the fuel cell stack by comparing the calculated fuel utilization of the fuel cell system and the measured recycle ratio to a pre-established fuel utilization model.

3. The method of claim 2, wherein controlling the fuel cell system prevents fuel starvation by comparing the calculated fuel utilization of the fuel cell system and a fuel utilization setpoint of the fuel cell system.

4. The method of claim 1, wherein controlling the fuel cell system comprises generating a warning signal or sending a notification when the estimated fuel utilization of the fuel cell stack is close to a fuel utilization high limit or a fuel utilization low limit of the fuel cell stack.

5. The method of claim 1, wherein controlling the system comprises:

adjusting one or more of the fuel flow rate provided into the reformer inlet of the fuel reformer, the current drawn from the fuel cell stack and the recycle ratio in the anode recirculation loop when the estimated fuel utilization of the fuel cell stack is close to a fuel utilization high limit or a fuel utilization low limit of the fuel cell stack.

6. The method of claim 1, wherein adjusting the fuel flow rate provided into the reformer inlet of the fuel reformer comprises:

increasing the fuel flow rate when the estimated fuel utilization of the fuel cell stack approaches a fuel utilization high limit of the fuel cell stack and decreasing the fuel flow rate when the estimated fuel utilization of the fuel cell stack approaches a fuel utilization low limit of the fuel cell stack.

7. The method of claim 1, wherein adjusting the current drawn from the fuel cell stack comprises:

decreasing the current drawn when the estimated fuel utilization of the fuel cell stack approaches a fuel utilization high limit of the fuel cell stack and increasing the current drawn when the estimated fuel utilization of the fuel cell stack approaches a fuel utilization low limit of the fuel cell stack.

8. The method of claim 1, wherein adjusting the recycle ratio in the anode recirculation loop comprises:

increasing the recycle ratio when the estimated fuel utilization of the fuel cell stack approaches a fuel utilization high limit of the fuel cell stack and decreasing the recycle ratio when the estimated fuel utilization of the fuel cell stack approaches a fuel utilization low limit of the fuel cell stack.

9. A method for operating a fuel cell system, the method comprising:

an estimated fuel utilization of a fuel cell stack that is approaching at least one of a fuel utilization high limit or a fuel utilization low limit of the fuel cell stack, controlling the fuel cell system to prevent fuel starvation by at least one of:

a) adjusting a fuel flow rate of a fuel supplied to a fuel reformer of the anode recirculation loop, b) adjusting current drawn from the fuel cell stack by an electrical load connected thereto, or c) adjusting a recycle ratio in the anode recirculation loop, wherein the recycle ratio is defined as a flow rate ratio of a recirculated reformate to a reformate, wherein the reformate is output by the fuel reformer and is divided into a slip reformate and the recirculated reformate, and wherein the recirculated reformate is recirculated back to the fuel cell stack.

10. The method of claim 9, wherein the estimated fuel utilization of the fuel cell stack is based on a measured fuel flow rate of the fuel supplied to the fuel reformer, a measured current drawn from the fuel cell stack, and a measured recycle ratio of the recirculated reformate to the reformate.

11. The method of claim 10, wherein the fuel utilization high limit of the fuel cell system is predicted from a fuel utilization model comprising the measured recycle ratio and a pre-established fuel utilization high limit of the fuel cell stack, and wherein the fuel utilization model defines a mapping relationship between a fuel utilization of the fuel cell stack, a fuel utilization of the fuel cell system, and the recycle ratio in the anode recirculation loop.

12. The method of claim 10, wherein the fuel utilization low limit of the system is determined based on a steam-to-carbon ratio (SCR) model.

13. The method of claim 12, wherein the SCR model defines a mapping relationship between the fuel utilization of the fuel cell system and the anode recirculation loop.

14. The method of claim 9, wherein controlling the fuel cell system comprises controlling the fuel cell system based on at least one of a fuel flow rate trim, a current trim, and a recycle ratio trim.

15. The method of claim 14, wherein the fuel flow rate trim, the current trim, and the recycle ratio trim are based on a predicted fuel utilization high limit of the fuel cell system, a predicted fuel utilization low limit of the fuel cell system, and the calculated fuel utilization of the fuel cell system.

16. The method of claim 14, wherein controlling the system comprises controlling the system based on at least one of a corrected fuel flow rate setpoint, a corrected current setpoint, and a corrected recycle ratio setpoint, wherein the corrected fuel flow rate setpoint defines a fuel flow rate setpoint corrected using the fuel flow rate trim, wherein the corrected current setpoint defines a current setpoint corrected using the current trim, and wherein the corrected recycle ratio setpoint defines a recycle ratio setpoint corrected using the recycle ratio trim.

17. A method for controlling a fuel cell system including a fuel cell stack, the method comprising:

estimating a fuel utilization of the fuel cell stack based on:

a) a measured fuel flow rate of fuel supplied to a fuel reformer of the fuel cell system, b) a measured current drawn by an electrical load connected to the fuel cell stack, and c) a measured recycle ratio in an anode recirculation loop, wherein the measured recycle ratio is defined as a ratio between a reformate being output by the fuel reformer and a portion of the reformate being recirculated to the fuel cell stack; and in response to the estimated fuel utilization of the fuel cell stack approaching one of a fuel utilization high limit or a fuel utilization low limit of the fuel cell stack, controlling the fuel cell system to prevent fuel starvation by at least one of:

a) adjusting a fuel flow rate supplied to the fuel reformer, b) adjusting the current drawn from the fuel cell stack, and c) adjusting the recycle ratio in the anode recirculation loop, wherein controlling the fuel cell system includes controlling the fuel cell system with respect to one of a fuel utilization high limit of the fuel cell system based on the measured recycle ratio and a pre-established fuel utilization high limit of the fuel cell stack and controlling the fuel utilization low limit of the system based on a steam-to-carbon ratio model.

18. The method of claim 17, wherein the measured fuel flow rate is indicative of a flow rate of fuel supplied from a fuel supply device, and wherein the measured recycle ratio is a flow rate ratio of a recirculated reformate to the reformate in the anode recirculation loop.

19. The method of claim 17, wherein estimating the fuel utilization of the fuel cell stack comprises:

calculating a fuel utilization of the fuel cell system based on the measured fuel flow rate, the measured current, and a number of fuel cells of the fuel cell stack and determining the fuel utilization of the fuel cell stack from a pre-established fuel utilization model according to the calculated fuel utilization of the system and the measured recycle ratio.

20. The method of claim 17, wherein adjusting the fuel flow rate provided to the fuel reformer comprises:

increasing the fuel flow rate when the estimated fuel utilization of the fuel cell stack approaches the fuel utilization high limit of the fuel cell stack and decreasing the fuel flow rate when the estimated fuel utilization of the fuel cell stack approaches the fuel utilization low limit of the fuel cell stack.

* * * * *